United States Patent
Dalgleish et al.

[11] 3,885,859
[45] May 27, 1975

[54] OPTICAL FIBRE CONNECTORS

[75] Inventors: Jack Frank Dalgleish, Ottawa; Helmut Hans Lukas, Carleton Place, Ontario, both of Canada

[73] Assignee: Northern Electric Company Limited, Montreal, Quebec, Canada

[22] Filed: June 24, 1974

[21] Appl. No.: 482,211

[52] U.S. Cl. .............................. 350/96 C; 350/96 B
[51] Int. Cl. ................................................. G02b 5/14
[58] Field of Search........... 350/96 C, 96 B, 96 WG, 350/96 R; 339/48, 49 B, 258 R, 258 P

[56] References Cited
UNITED STATES PATENTS

| | | | |
|---|---|---|---|
| 3,455,625 | 7/1969 | Brumley et al..................... | 350/96 C |
| 3,704,996 | 12/1972 | Borner et al....................... | 350/96 C |
| 3,734,594 | 5/1973 | Trambarulo ....................... | 350/96 C |

Primary Examiner—Ronald L. Wibert
Assistant Examiner—Jon W. Henry
Attorney, Agent, or Firm—Sidney T. Jelly

[57] ABSTRACT

An optical fibre connector for connecting optical fibres in accurate end-to-end alignment has two holding members, a holding member for each fibre. A shaped groove, for example a Vee-groove, is provided generally in one of the holding members. A fibre is held in each member and as the two holding members are brought together in assembled position the fibres are brought into end-to-end relationship over the shaped groove. A resilient member pushes the ends of the fibres down into the groove to give accurate end-to-end alignment.

10 Claims, 20 Drawing Figures

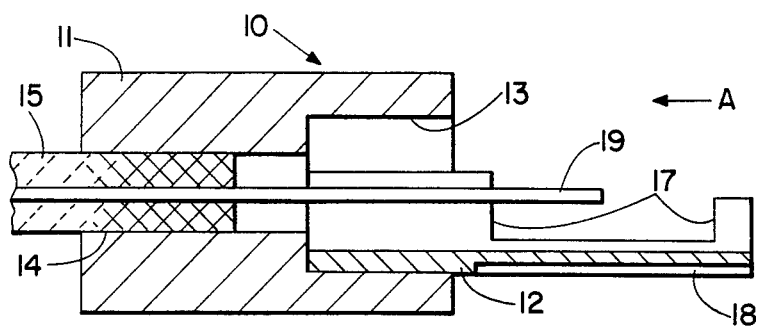
Fig. 1
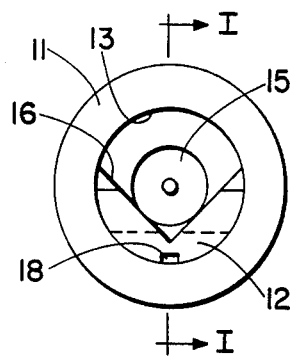
Fig. 2
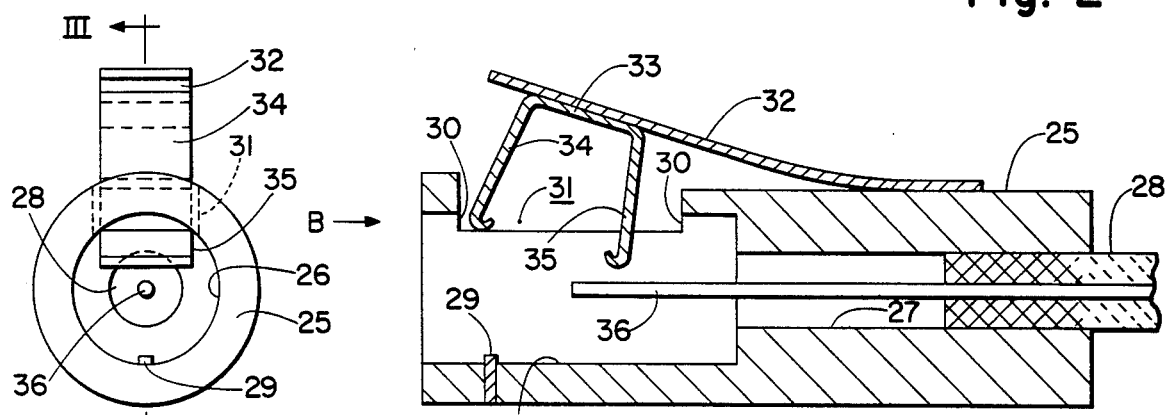
Fig. 3
Fig. 4
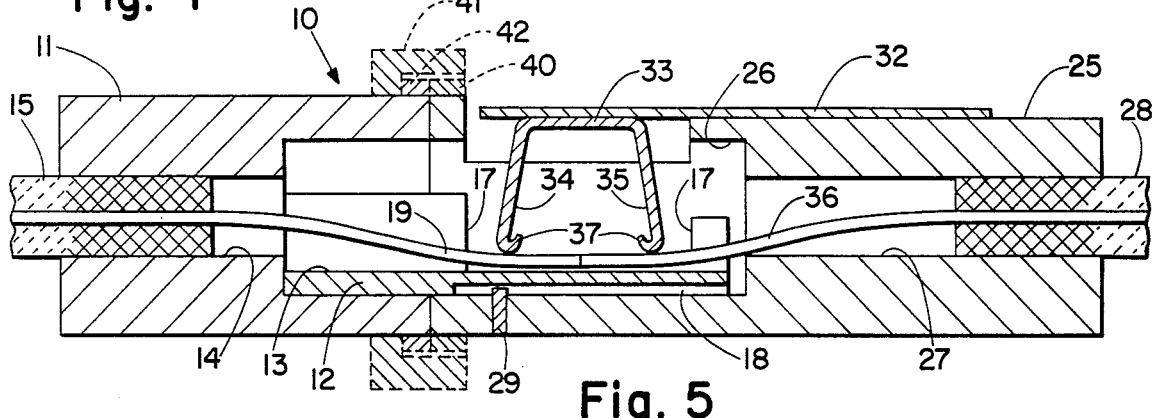
Fig. 5
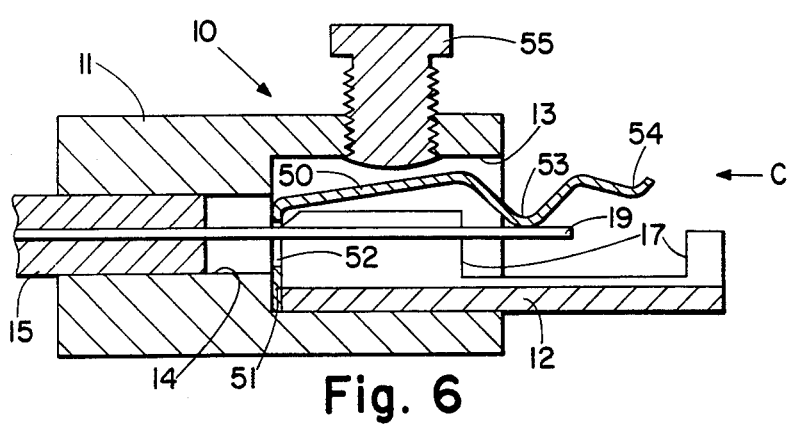
Fig. 6
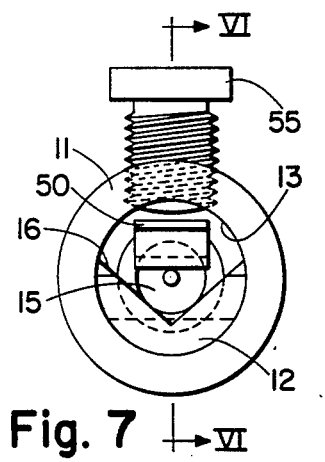
Fig. 7

PATENTED MAY 27 1975　　　　　　　　　3,885,859

SHEET 2

PATENTED MAY 27 1975 3,885,859

SHEET 3

OPTICAL FIBRE CONNECTORS

This invention relates to optical fibre connectors, particularly, though not exclusively, for connecting such fibres when used in communications systems.

The connection of optical fibres, in end-to-end relationship, is not an easy task, particularly when high coupling efficiencies are required. In a communications system, for example, it is necessary to provide for the coupling of fibres end-to-end and to couple fibres to other items, such as detectors, signal generators and the like. Every coupling is a source of signal loss. Any axial misalignment at the coupling will reduce the strength of the signal across the joint or splice.

Accurate connectors have been made but require conditions of assembly which, while fairly readily attainable in the laboratory, are not easily attained in the field. Ideally a connector should be relatively simple, cheap and easy to make, be capable of being coupled and uncoupled at will many times without degradation of the coupling accuracy and, of course, provide accurate axial alignment of the fibre ends.

The present invention provides simple and economic connectors having a high degree of accuracy. Broadly a coupling in accordance with the present invention comprises two holding members, one for each fibre to be joined or coupled end-to-end, and a resilient member which acts to urge the opposed ends of the fibres into end-to-end alignment in a shaped groove when the coupling is assembled.

The invention will readily be understood by the following description of certain embodiments by way of example in conjunction with the accompanying diagrammatic drawings, in which:

FIG. 1 is a cross-section through one member of coupling, on the line I—I of FIG. 2;

FIG. 2 is an end view of the member of FIG. 1, in the direction of arrow A;

FIG. 3 is a cross-section through the other member of a coupling, for cooperation with the member of FIGS. 1 and 2, on the line III—III of FIG. 4;

FIG. 4 is an end view of the member of FIG. 3, in the direction of arrow B;

FIG. 5 is a cross-section through an assembled connector comprising members as in FIGS. 1 to 4;

FIG. 6 is a cross-section through one member of an alternative form of coupling, on the line VI—VI of FIG. 7;

FIG. 7 is an end view of FIG. 6 in the direction of arrow C;

Figure 9:
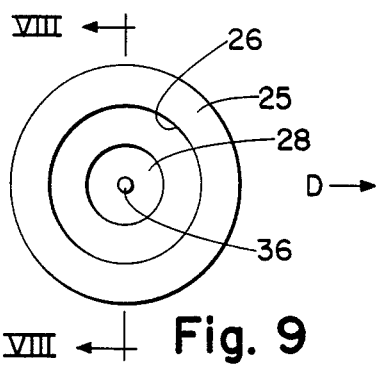
FIG. 9 is an end view of FIG. 8 in the direction of arrow D.

As stated, FIGS. 1 to 5 illustrate one embodiment of the invention. FIGS. 1 and 2 illustrate a first holding member 10 which comprises a main body portion 11 and an elongate locating member 12 extending from the main body portion. The body portion 11 has a large bore 13 at its forward end into which fits one end of the locating member 12. A smaller diameter bore 14 extends through the remainder of the body portion and is of a size to be a close fit for a coated optical fibre 15.

The locating member 12 has a Vee-shaped groove 16, as seen in FIG. 2. The exterior of the locating member is a part cylinder, to fit in the bore 13 of the body portion 11 and may be retained therein by any suitable means, such as a pin, or screw, by an interference fit, brazing and the like. Intermediate the ends of the locating member, it is cut away by a transverse channel formation 17 for a purpose to be described. A locating groove 18 is formed in the base of the locating member 12 for cooperation with a locating pin in the other holding member, as will be described.

As seen in FIG. 1, the coated fibre 15 extends part way through the bore 14. The coating is stripped from the end portion for the uncoated fibre 19 to extend forward over the locating member 12.

FIGS. 3 and 4 illustrate a second holding member 25, having a forward large bore 26 and a smaller bore 27 extending from the large bore 26 through the remainder of the member 25. The bore 26 is a sliding fit on the locating member 12 of the first holding member 10, and the bore 27 is a close fit for a coated optical fibre 28. A locating pin 29 extends into the bore 26 and is positioned to engage with the locating groove 18 of holding member 10, as previously described.

A channel shaped groove 30 is made across the holding member 25 to form an access aperture 31 to the bore 26. Aperture 31 provides access for a spring locking member 32. Locking member 32 is attached at one end to the holding member 25 and adjacent its other end an extension 33 is attached. In the example illustrated the extension 33 has two spaced apart legs 34 and 35, which extend through the aperture 31. The locking member 32 could be made as one part with the extension 33.

As seen in FIG. 3, the coated fibre 28 extends part way through the bore 27, the coating being stripped from the end portion for the uncoated fibre 36 to extend forward into the bore 26. The relative positioning of pin 29 and groove 18 is such that the top surface of the transverse channel 17 is parallel to the extreme ends of the legs 34, 35 of the locking member 32. This ensures that the legs 34, 35 maintain contact with the uncoated fibres 19, 36, without interference.

The two holding members 10 and 25 are shown connected together in FIG. 5. The positions of the ends of the uncoated fibres 19 and 36 relative to the holding members is such that when the two members 10 and 25 are pushed together, the ends of the uncoated fibres 19 and 36 abut. The locating member 12 projects forward into the large bore 26 and underlies the uncoated fibre 36. The two uncoated fibres are then pushed down into the Vee-shaped groove 16 with the walls of the groove acting as guides. The cutting away of the locating member by the transverse channel formation 17 (FIG. 1) permits the legs 34 and 35 of the locking member 32 to press and retain the uncoated fibres 19 and 36 firmly into the base of the Vee-shaped groove 16. The legs 34 and 35 have their bottom ends curved over, or otherwise smoothed at 37, to prevent possible damage to the uncoated fibres.

The locking member can act in either of two ways. It can be spring loaded by inherent tension to be urged downwards into a locking position. In such an arrangement, it will be necessary to lift the locking member 32 before making, or breaking, a connector. Alternatively the locking member can be spring loaded to be urged out of a locking position, for example to a position as in FIG. 3. It will then be necessary to provide some means for holding the locking member down when the connector is assembled. For example a sleeve can be provided for pushing over the holding member 25 when the connector is assembled.

Some means will normally be provided for retaining the two holding members together. One way is indicated by dotted lines in FIG. 5. An enlargement 40 is provided on the forward end of holding member 25, the enlargement threaded on its periphery. A retaining nut 41, acting against a shoulder 42 on holding member 10, screws onto the enlargement 40.

The embodiment illustrated in FIGS. 6 to 10 is very similar to that of FIGS. 1 to 5, and where applicable the same reference numerals are applied. The main difference is that a different form of locking member is provided, with means for moving this locking member into locking position.

FIGS. 6 and 7 illustrate the first holding member 10 with main body portion 11 and the locating member 12. The body portion 11 has a large bore 13 as before, and a smaller diameter bore 14 for the coated fibre 15. There is a Vee-shaped groove 16 and the locating member is cut away at 17 as previously. In the present example, a locking member 50 is positioned in the large bore 13. The locking member 50 is formed, for example, from strip material and has an end flange 51 which is held between the inner end of the locating member 12 and the inner end of the bore 13. The flange 51 has an aperture 52 for the passage of uncoated fibre 19 therethrough. The holding member 50 is resilient, or springy, and normally extends in a generally axial direction in the bore 13 out of the way of the uncoated fibre 19. As seen in FIG. 6, the locking member has two transverse bends 53 and 54. The position of these bends will be described later in relation to an assembled connector. No locating groove 18 as in FIG. 1, is required in the present example as the locating member 12 and the locking member 50 are in the same holding member.

Figure 8:
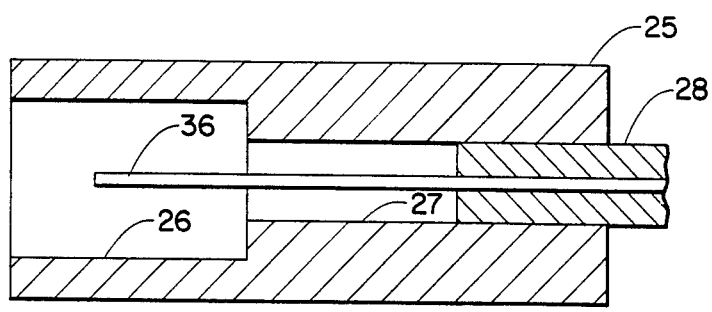
FIG. 8 is a cross-section through the other member of the alternative form of coupling, for cooperation with the member of FIGS. 6 and 7, on the line VIII—VIII of FIG. 9.
Figure 10:
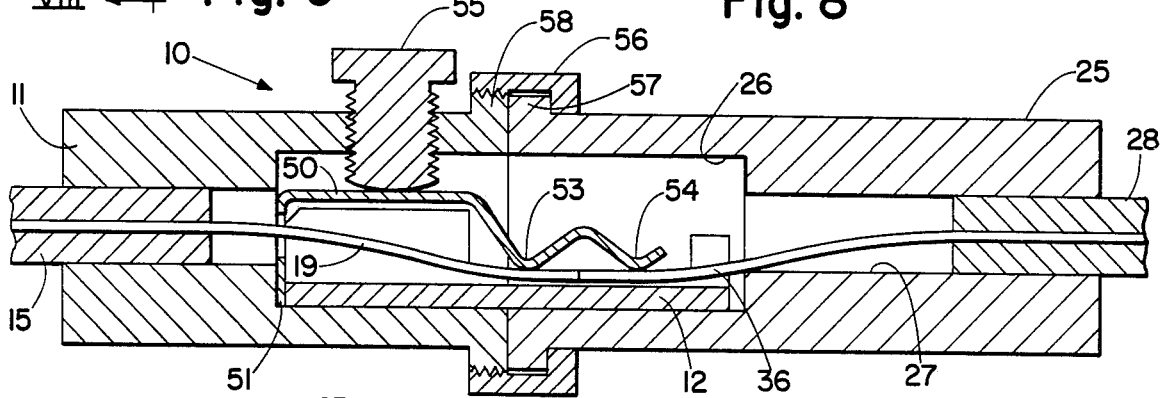
FIG. 10 is a cross-section through an assembled connector comprising members as in FIGS. 6 to 9.

FIGS. 8 and 9 illustrate the second holding member 25. In the present example no access aperture is required and therefore the holding member is not cut away. The member has a forward large bore 26 and smaller bore 27 for the coated fibre 28. The bore 26 is a sliding fit on holding member 10. The uncoated fibre 36 extends into the bore 26 as before. No locating pin is necessary, as explained above in relation to the groove, but it may be advisable to provide some means to prevent relative rotation between holding members to lessen chances of damage to the fibres during assembly of the coupling.

The connector is assembled by sliding the two holding members together. The ends of the uncoated fibres 19 and 36 are arranged to abut when the connector is assembled. The locking member 50 is then pushed down by a screw 55 in a threaded hole in the body portion 11 of the first holding member 10. The screw 55 passes down the holding member which in turn pushes down the ends of the uncoated fibres 19 and 36, the walls of the groove acting as guides. The two transverse bends 53 and 54, previously referred to, are positioned so that one bend 53 is on the end of the uncoated fibre 19, while the other end 54 is on the end of the other uncoated fibre 36. The holding member 50 is oriented with respect to the locating member 12 such that the top surface of the transverse channel 17 is parallel to the surfaces of the bends 53 and 54, enabling the locking member 50 to maintain contact with the fibres without interference from the top surface of the transverse channel 17.

Conveniently the two holding members 10 and 25 are retained together by a retaining nut 56 abutting a shoulder 57 on holding member 25 and screwing onto a threaded enlargement or flange 58 on the end of the body portion of the first holding member 10. While the locating member 12 in the connector illustrated in FIGS. 1 to 12 is shown as a separate member, it could be integral with the holding member 10. A modification to locking member 50 would be required.

In the embodiment of the invention illustrated in FIGS. 11 to 16 a sideways movement of the two holding members towards each other occurs when making a connection or coupling, instead of a relative axial movement as in the previous examples.

Figure 11:
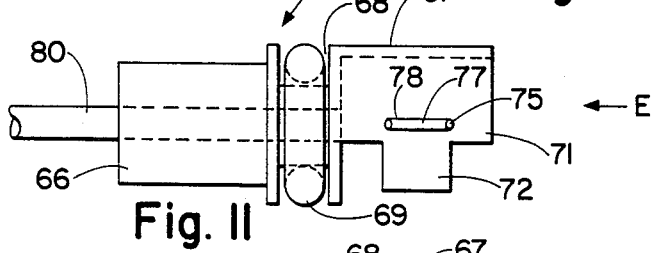
FIG. 11 is a side view of one holding member of yet a further embodiment.
Figure 12:
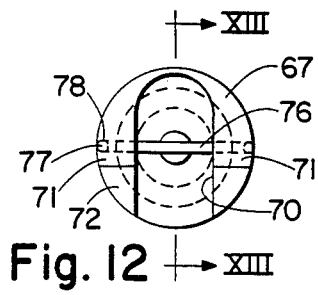
FIG. 12 is an end view of the member of FIG. 11 in the direction of arrow E.
Figure 13:
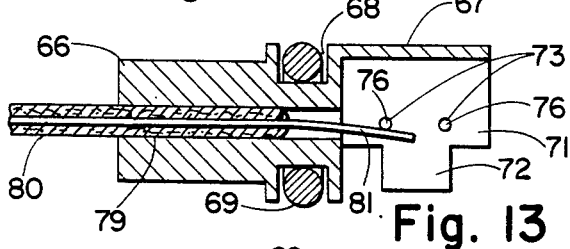
FIG. 13 is a cross-section on the line XIII—XIII of FIG. 12.
Figure 14:
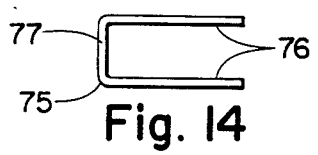
FIG. 14 is a view of a resilient member as used in the holding member of FIGS. 11 to 13.

FIGS. 11, 12 and 13 illustrate one of the holding members 65. It is of cylindrical form and has a rear portion 66 and a forward portion 67 of slightly larger diameter than portion 66, although this is not essential. A circumferential groove 68 extends round the portion 67, near its junction with portion 66, and a "O" ring 59 is positioned in the groove 68. The forward portion has a U-shaped recess 70 extending from one side so that the forward portion 67 has a U-shaped cross-section with two legs 71. Transverse cuts cut away parts of the lower portions of legs 71 to leave remaining locating and retaining portions 72.

Two small holes 73 are formed in each leg 71, in the present example on the axis of the holding member. Inserted from one side of the holding member is a resilient member 75, FIG. 14, of U-shape and having two parallel leg portions 76. The leg portions pass through the holes 73 to extend across the recess 70, as seen in FIG. 12. The crossbar 77 of the member 75 is recessed below the periphery of the holding member 65, being in a short axially extending groove 78 formed in the outer surface of one of the legs 71.

A bore 79 extends through the rear portion 66 of the holding member 65, of a size to be a close fit on a coated fibre 80. The coated fibre has the coating removed at its end and the uncoated fibre 81 extends out of the bore 79 into the recess 70, by a predetermined amount. The end of the uncoated fibre is positioned under one of the legs 76 of the resilient member 75, as seen in FIG. 13.

Figure 15:
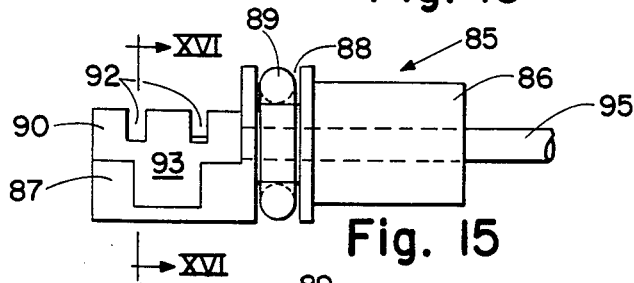
FIG. 15 is a side view of the other holding member of the embodiment.
Figure 16:
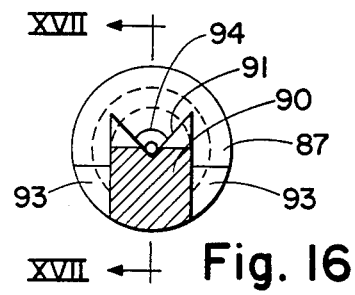
FIG. 16 is a cross-section on the line XVI—XVI of FIG. 15.
Figure 17:
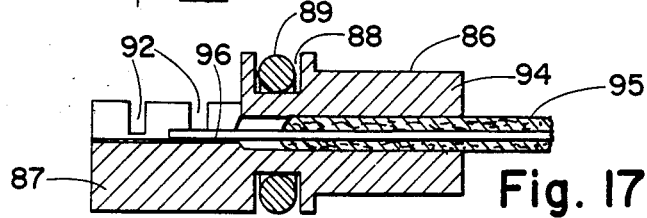
FIG. 17 is a cross-section on the line XVII—XVII of FIG. 16.

FIGS. 15 to 17 illustrate the other holding member 85 which cooperates with member 65. Member 85 is of cylindrical form and has a rear portion 86 and a forward portion 87 which acts as a locating member. The forward portion 87 is of slightly larger diameter than the rear portion 86 in the example illustrated, but this is not essential. A circumferential groove 88 extends round the forward portion 87, near its junction with the rear portion 86 and a "O" ring 89 is positioned in the groove 88. The forward portion 87 is cut away to give a cross-section somewhat in the form of an inverted T. The leg of the T-shape has a Vee-shaped groove 91 cut in its end. Two transverse slots 92 are made across the Vee-shaped groove for access by the legs 76 of the resilient member 75 when the two holding members are assembled together. Two further channels 93 are cut one in each end of what can be considered as the crossbar of the T shape. These channels are positioned and dimensioned to accept the locating portions 72 on the legs 71 of the holding member 65. The dimensions of the portions 72 and channels 93 and their relative positions in the holding members 65 and 85, are such as to provide a close fit between portions 73 and channels 93 and to accurately control the relative positions of the uncoated ends of the fibres.

A bore 94 extends through the rear portion 86 of the holding member 85 of a size to be a close fit on a coated optical fibre 95. The coating of the fibre is removed for a short length at the end of the fibre and the uncoated fibre 96 extends into the Vee-shaped groove 91 a predetermined amount. The uncoated fibre 96 extends to a position that, when the connector is assembled it will be in abutting relationship with the end of the uncoated fibre 81, and will underlie the other leg 76 of the resilient member 75.

Figure 18:
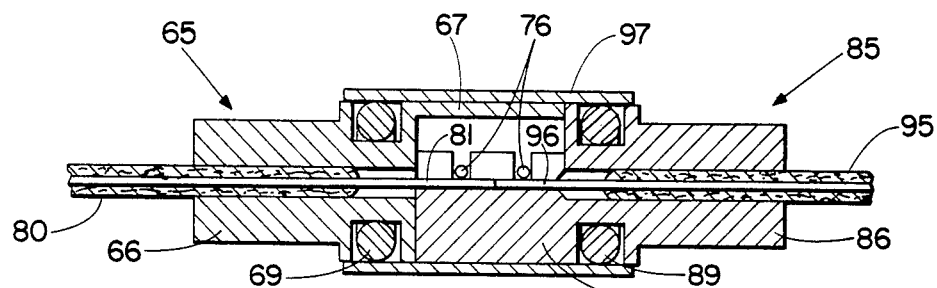
FIG. 18 is a cross-section through an assembleld connector comprising holding members as assembled FIGS. 11 to 17.

The connector is assembled by bringing the two holding members into side-by-side relationship and then moving them laterally into engagement. The locating portions 72 of the legs 71 on the forward portion 67 of holding member 65 enter the channels 93 in the forward portion 87 of holding member 85. As the two holding members are moved into their final assembled position the resilient member 75 urges the uncoated fibres firmly into the Vee-shaped groove 91, the walls of the groove acting as guides. This is seen in FIG. 18. A sleeve 97 is pushed over the assembled holding members, retaining the members in position. The O-rings 69 and 89 seal the interior of the connector against ingress of dust, etc. While the O-rings provide a simple and convenient means of sealing, they are not essential.

Figure 19:
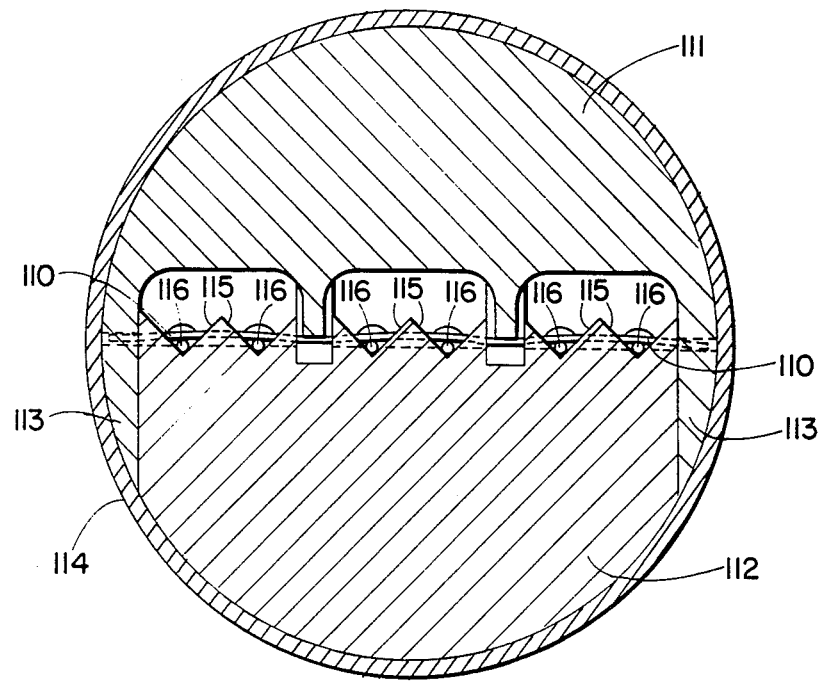
FIG. 19 is a cross-section through a connector for a plurality of pairs of fibres, using a resilient member somewhat as in FIGS. 11 to 18.
Figure 20:
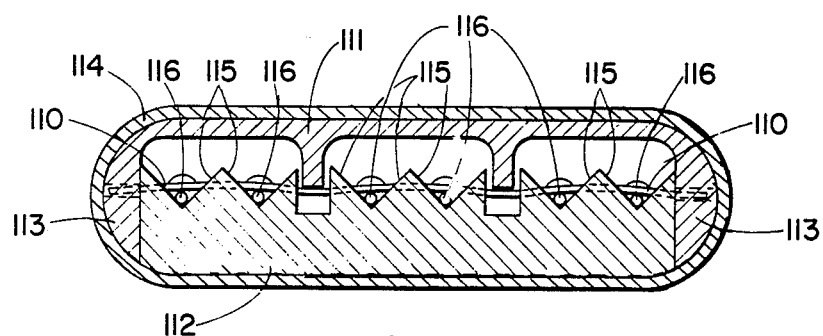
FIG. 20 is a modified form of the connector illustrated in FIG. 19.

The invention can also be applied to connecting a plurality of fibres in opposed pairs. FIGS. 19 and 20 illustrate one example of such a connector. FIG. 19, which is a diagrammatic cross-section of a connector uses a resilient member 110 similar in form to the resilient member 75 in FIGS. 11 to 14. In FIG. 19, the forward portion 111 of one holding member is seen and the forward portion 112 of the other holding member. These portions 111 and 112 correspond to members 67 and 87 respectively of the embodiment illustrated in FIGS. 11, 12 and 13. Retaining and locating portions 113 correspond to portions 72 in FIGS. 11, 12 and 13. Also shown is a sleeve 114 corresponding to sleeve 97 of FIG. 18.

A plurality of Vee-shaped grooves 115 are formed in the forward portion 112. The resilient member 110 extends across the assembled connector and holds down the uncoated fibres 116 in the grooves 115. There will be two fibres in opposed abutting relationship.

The connector of FIG. 19 is cylindrical, as the connectors of the previously described embodiments. To reduce the bulk of the connector, the parts can be made rectangular in cross-section, as illustrated in FIG. 20, where the same reference numerals are applied to the same items as are in FIG. 19. It is also possible to provide other arrangements of the fibres in the connector to reduce the size of the connector. Also, several rows of fibres could be accommodated in a connector as in FIG. 19, preferably using a plurality of locating members.

Optical fibres may vary in type, although generally they are of two forms, one in which the fibre has a core of one refractive index and a cladding of another — lower — refractive index, and the other in which the fibre has a graded refractive index, the refractive index varying continuously with radius, the index being higher at the centre and lower at the outside. A protective coating, usually plastic, is often placed over both types of fibre. This coating improves the mechanical handling characteristics of the fibre.

To use a coated fibre in connectors, as in the present invention, it is necessary to remove the plastic coating from the end portion of the fibre. This can be done, for example, in an acid bath or by heat stripping. It is also desirable to prepare the end of the fibre by polishing or by a suitable breaking technique to produce a smooth end surface perpendicular to the longitudinal axis of the fibre.

In the examples illustrated the uncoated fibres should be approximately the same diameter. The use of a Vee-shaped groove, having a sharp point at its base, or having a radius at its base smaller than the radius of any fibre to be coupled, makes the groove independent of fibre size. Thus a connector using a Vee-shaped groove will accept fibres of different diameters but for the most efficient coupling both fibres should be the same diameter. However it is possible to use grooves having different cross-sections for example U-shaped. This will restrict the versatility to some extent.

It is also possible to provide for coupling two fibres of differing diameters. In such an instance the groove will need to be stepped, as illustrated by the dotted line 100 in FIG. 17.

The Vee-shaped groove provides efficient fibre to fibre coupling by locating and holding the fibres in the groove. The side walls of the groove act as guides to direct the fibres into the bottom of the Vee. The angle of the Vee can vary. While an angle of approximately 90° has been shown this angle can be smaller or larger than 90°.

The coated fibre can be retained in the holding member by various methods. Typical examples are mechanical means, such as clamps, or crimping, or by the use of adhesives.

An index matching fluid can be used to improve the light coupling by eliminating the air gap between the ends of the coupled fibres. The fluid can be added before or during assembly of the connector.

What is claimed is:

1. An optical fibre connector for connecting pairs of optical fibres in accurate end to end relationship comprising:
   a first holding member for holding one of a pair of fibres and a second holding member for holding the other of said pair of fibres;
   at least one locating member extending from one of said holding members for cooperation with the other of said holding members for axial end to end location of said holding members;
   at least one groove in said locating member, said groove extending in a direction parallel to the longitudinal axis of the connector;
   means for retaining said holding members in opposed assembled relationship;
   means in each member for acceptance of at least one optical fibre, the fibres in end-to-end abutting relationship adjacent said locating member;
   resilient means for urging the ends of said fibres into said groove.

2. A connector as claimed in claim 1, including an axially extending bore in each of said holding members, said locating member comprising an elongated member positioned in said axial bore of said one of said holding members and including an end portion extending from said first holding member to enter said axial bore of said second holding member.

3. A connector as claimed in claim 1, said groove a Vee-shaped groove.

4. A connector as claimed in claim 1, said resilient means comprising a spring locking member attached to one of said holding members.

5. A connector as claimed in claim 4 said locking member including two parallel spaced apart formations extending normal to the longitudinal axis of the connector, the formations positioned to bear on the opposed ends of the optical fibres, one formation on the end of one fibre and the other formation on the end of the other fibre.

6. A connector as claimed in claim 1 said locating member being integral with and extending axially from one of said holding members.

7. A connector as claimed in claim 6 including a cylindrical portion extending axially from the other of said holding members, said locating member positioned to engage with said cylindrical portion on assembly of said connector.

8. A connector as claimed in claim 7 including interengaging formations on said locating member and said cylindrical portion, said formations extending normal to the longitudinal axis of the connector, said holding members being assembled together by relative lateral movement in a direction normal to the longitudinal axis of the connector.

9. A connector as claimed in claim 1 comprising a plurality of parallel grooves in said locating member.

10. A connector as claimed in claim 1 comprising a plurality of locating members in said holding member and at least one groove in each locating member.

* * * * *